UNITED STATES PATENT OFFICE.

HERMANN H. SPOHN, OF BOSTON, MASSACHUSETTS, ASSIGNOR TO CARTER'S INK COMPANY, OF BOSTON, MASSACHUSETTS, A CORPORATION OF MASSACHUSETTS.

INK.

SPECIFICATION forming part of Letters Patent No. 719,623, dated February 3, 1903.

Application filed January 6, 1902. Serial No. 88,650. (No specimens.)

*To all whom it may concern:*

Be it known that I, HERMANN H. SPOHN, a subject of William, Emperor of Germany, residing at Boston, in the county of Suffolk and State of Massachusetts, have invented a new and useful Improvement in Inks, of which the following is a full, clear, and exact description.

The invention relates to an indelible ink especially adapted for use in filling out checks, notes, and other important papers. Heretofore there has been used for this purpose an ink which has been called a "non-erasive" ink and which was indelible as against chemical erasure, but not as against erasure by washing in water; and my invention applies to an ink for similar purposes which is not only not removable chemically, but is also proof against removal by water.

In the manufacture of the ink for a quantity measuring ten gallons I employ about one pound and four ounces of soluble Prussian blue, about ten ounces of an anilin dye, about four ounces of commercial tannin, and about four ounces of carbolic acid, with about seventy-seven and one-half pounds of water. The proportions of these ingredients may vary within reasonable or commercial limits.

I prefer to dissolve the Prussian blue separately in about a gallon of water and also to dissolve the anilin dye and the tannin in about a half a gallon of water to each. I then boil the dissolved tannin and the dissolved dye together for about ten minutes, although the length of time is not material. I then add to the boiled dye-and-tannin solution the dissolved Prussian blue and boil the entire mixture for the same length of time. The mixture is then permitted to cool slowly, and after it has cooled I add the carbolic acid to it and thoroughly incorporate it therewith by mixing and then add the remainder of the water to it, and the ink is then ready for marketing and use.

An ink of this character will flow freely from the pen, will not corrode, and will not thicken with age, either exposed to the air or otherwise, and it is especially useful where an indestructible record is required, as it is proof against chemical affiliations, which might tend to neutralize or remove it from the paper, and is likewise proof against the use of water or any other substance for the same purpose.

I would state that I do not confine myself to the special proportions of the ingredients herein indicated; neither do I confine myself to the particular method of associating them; nor is it always necessary that the Prussian blue, tannin, and dye be combined by boiling, although this is the approved way.

The Prussian blue I prefer to use may be either the Prussian blue made by ferrocyanhydric acid or its salts with a ferri salt or by ferricyanhydric acid or its salts with a ferro salt, both being well-known commercial products.

The anilin dye is used to give the ink a darker shade than would be given by Prussian blue alone and may in some instances be dispensed with. It is preferable, however, to use it, because it gives the ink a color which is considered more desirable.

Carbolic acid prevents the ink from molding and gives it increased fluidity; but any equivalent organic acid for preventing molding and increasing the fluidity may be used.

Having thus fully described my invention, I claim and desire to secure by Letters Patent of the United States—

1. The improved ink herein described, the same comprising a mixture of soluble Prussian blue, tannin, anilin dye and carbolic acid in about the proportions named associated together and with water in substantially the manner and about the proportions stated.

2. The improved ink herein described, the same comprising a boiled mixture of soluble Prussian blue, tannin and anilin dye in about the proportions indicated combined with water and carbolic acid in about the proportions stated.

3. The improved chemical-proof and wash-proof ink containing soluble Prussian blue, tannin and an organic acid for increasing its fluidity and preservation.

HERMANN H. SPOHN.

Witnesses:
F. F. RAYMOND, 2d,
J. M. DOLAN.